United States Patent [19]

Commins

[11] Patent Number: 4,932,173

[45] Date of Patent: Jun. 12, 1990

[54] TRUSS CLIP

[75] Inventor: Alfred D. Commins, Danville, Calif.

[73] Assignee: Simpson Strong-Tie Company, Inc., San Leandro, Calif.

[21] Appl. No.: 374,160

[22] Filed: Jun. 29, 1989

Related U.S. Application Data

[63] Continuation-in-part of Ser. No. 222,192, Jul. 21, 1988.

[51] Int. Cl.⁵ .......................... E04B 7/04; E04B 1/38
[52] U.S. Cl. .......................................... 52/92; 52/702; 52/712; 403/232.1; 403/403
[58] Field of Search .................... 52/92, 93, 696, 702, 52/712; 403/232.1, 389, 400, 403

[56] References Cited

U.S. PATENT DOCUMENTS

| | | | |
|---|---|---|---|
| 3,256,030 | 6/1966 | Banse | 52/712 |
| 3,633,950 | 1/1972 | Gilb | 52/702 |
| 3,727,358 | 4/1973 | Howell | 52/712 |
| 4,498,801 | 2/1985 | Gilb | 403/232.1 |

OTHER PUBLICATIONS

Structural Wood Fasteners: Jun. 1972 TECO 15 pages.

Primary Examiner—Michael Safavi
Attorney, Agent, or Firm—James R. Cypher

[57] ABSTRACT

A building frame connection including a metal connector for attaching plated wood trusses to wood top plates or mudsills in building structures consisting of a single member constructed from sheet metal including a base member for slidably receiving the bottom edge of the truss, a sail member formed with slotted nail openings and positioned in face to face registration with the side face of the truss, a pair of stabilizer members connected to the sail member, a pair of holding members connected by nails to the stabilizer members and affixed to the wood top plates or mudsills and nails inserted through the slots in the sail member and into the truss member enabling substantial horizontal relative movement of the truss with respect to the top plate but preventing uplift of the truss relative to the top plate. In a preferred form of the invention, projections protrude from the front face of the sail member preventing seating of the nail heads against the front face of the sail member.

6 Claims, 8 Drawing Sheets

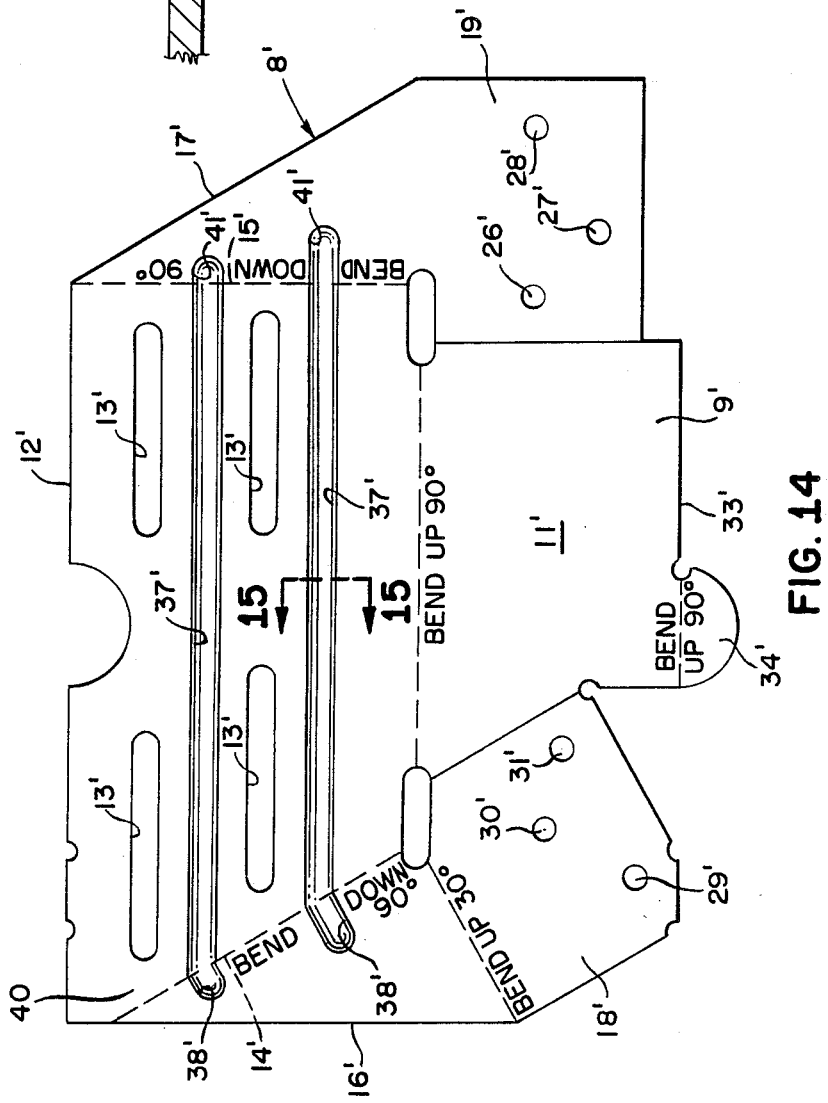

TRUSS CLIP

This is a continuation-in-part of my co-pending application Ser. No. 07/222,192, filed July 21, 1988 entitled TRUSS CLIP.

BACKGROUND OF THE INVENTION

The present invention relates to connectors for attaching plated wood trusses, especially scissors trusses to wood top plates or mudsills in building structures.

The main purpose of a truss clip is to prevent the roof structure from separating from the wall structure in the event of a cataclysmic event such as a hurricane, tornado, or some special types of earthquakes where there is a large uplift component force.

SUMMARY OF THE INVENTION

The key to the present truss clip is its ability to enable substantial limited horizontal relative movement between the roof truss and the top wall plate or mudsill, yet withstand large upward forces.

An object of the present invention is to provide a truss clip which is constructed in such a manner as to minimize the possibility of incorrect installation.

A further object is to provide a truss clip which is relatively inexpensive to manufacture and install.

Still another object is to provide a truss clip which provides greater overturn resistance than other commercially available truss clips.

A still further object is to provide a truss clip in which the moment arm between the holding fasteners and the application of the uplift force is minimal.

Another object is to provide a truss clip which is more resistant to buckling than presently available truss clips.

A further object is to provide a truss clip which is less prone to causing splitting of the top plate under maximum load conditions.

A still further object is to provide a truss clip which is not subject to tearing failure due to "notch effect".

BRIEF DESCRIPTION OF THE DRAWINGS

FIG. 14 is a plan view of the alternate truss clip blank prior to bending.

FIG. 15 is a partial cross section on an enlarged scale taken along line 15—15 of FIG. 14.

DESCRIPTION OF THE PREFERRED EMBODIMENTS OF THE INVENTION

Figure 1:
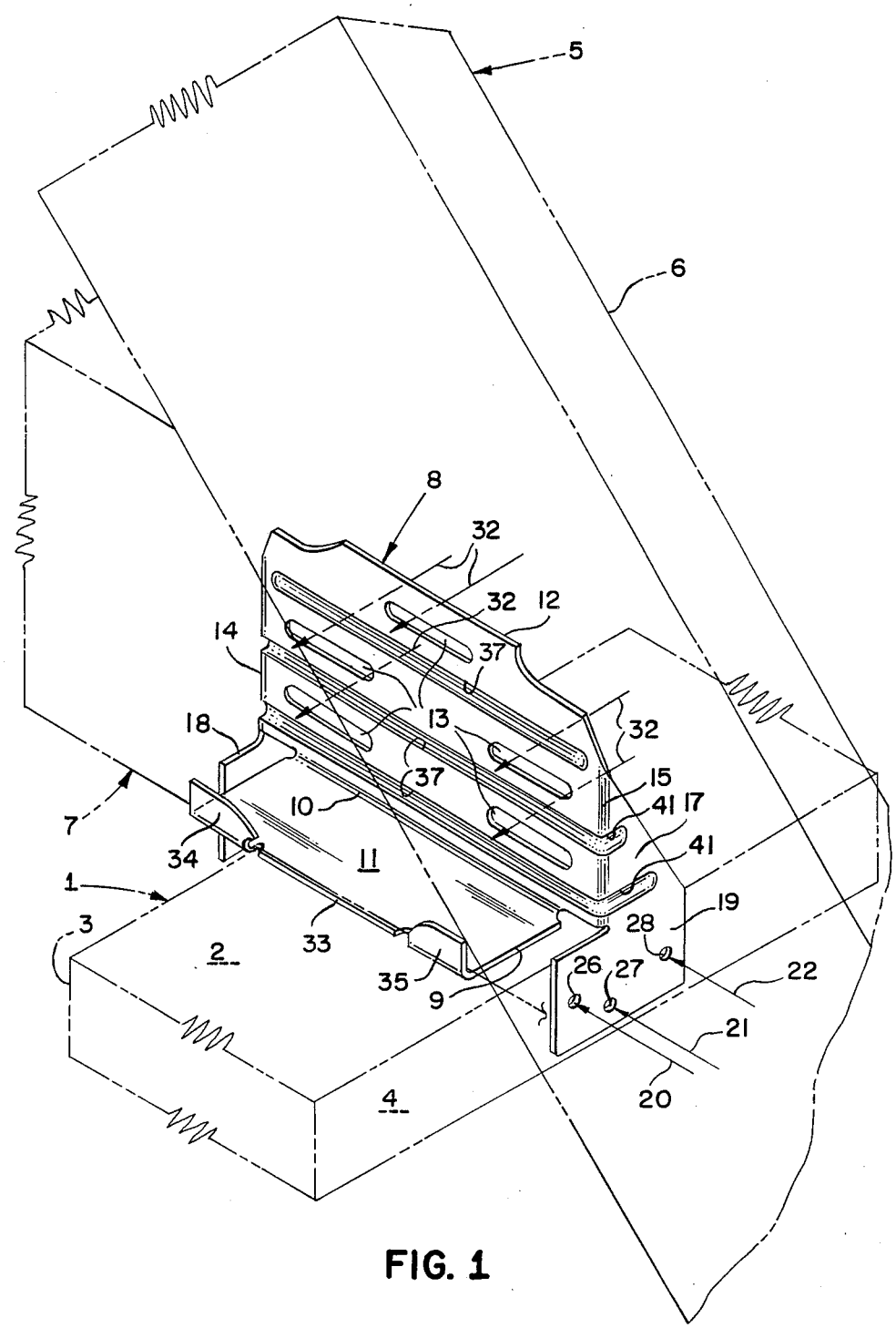
FIG. 1 is a perspective view of the truss clip of the present invention. The broken lines illustrate a typical installation in which a scissors truss is mounted on a top plate.
Figure 2:
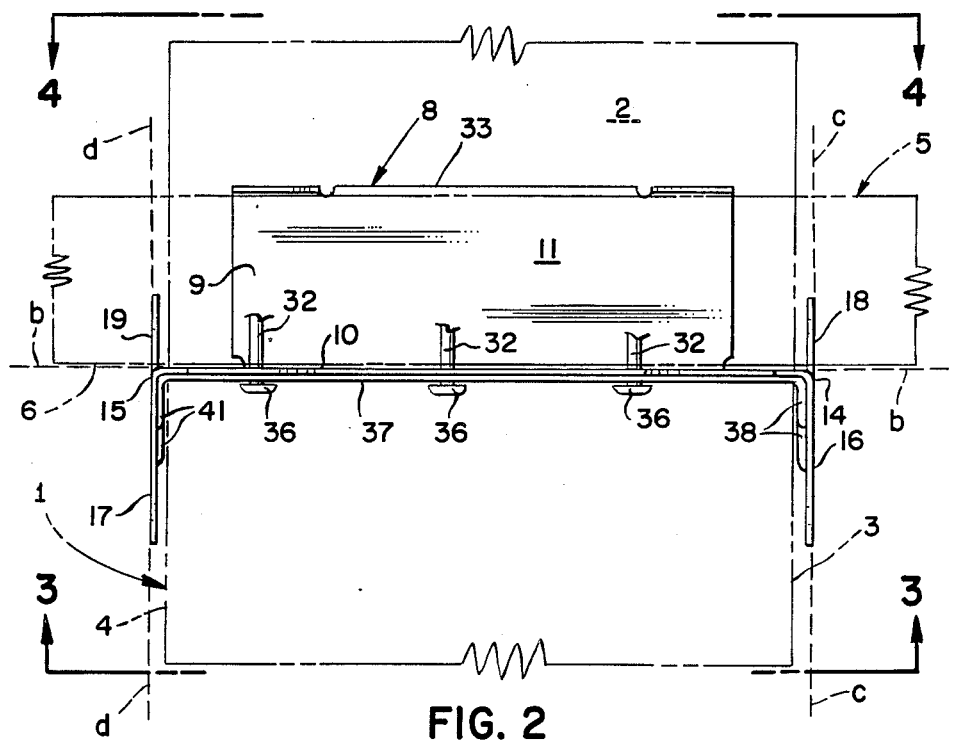
FIG. 2 is a top plan view of the truss clip of the present invention illustrated in FIG. 1.
Figure 3:
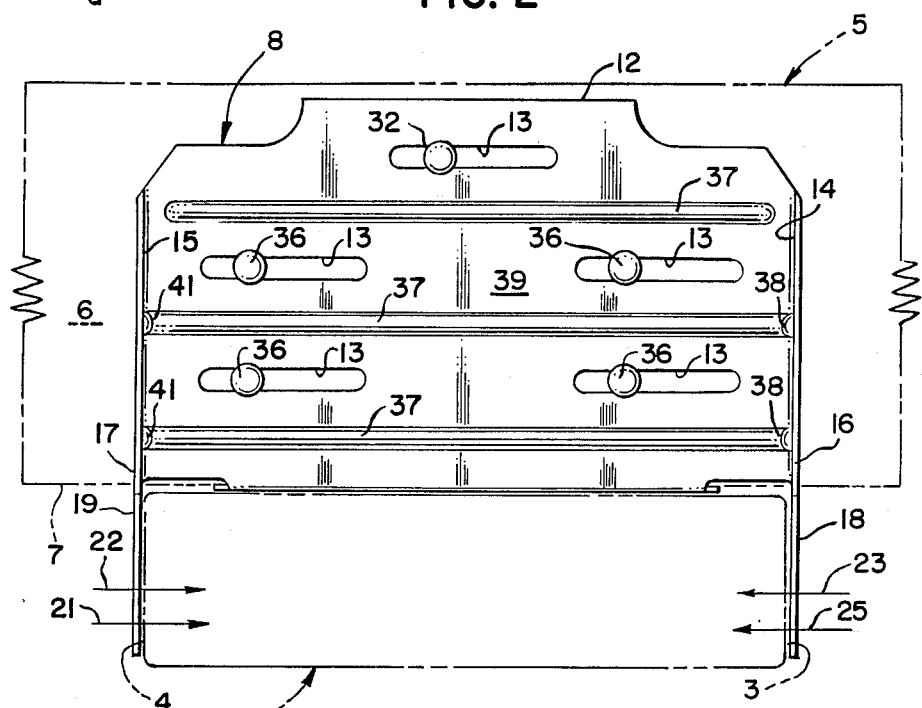
FIG. 3 is a side view of the truss clip taken in the direction of arrows 3—3 in FIG. 2.
Figure 4:
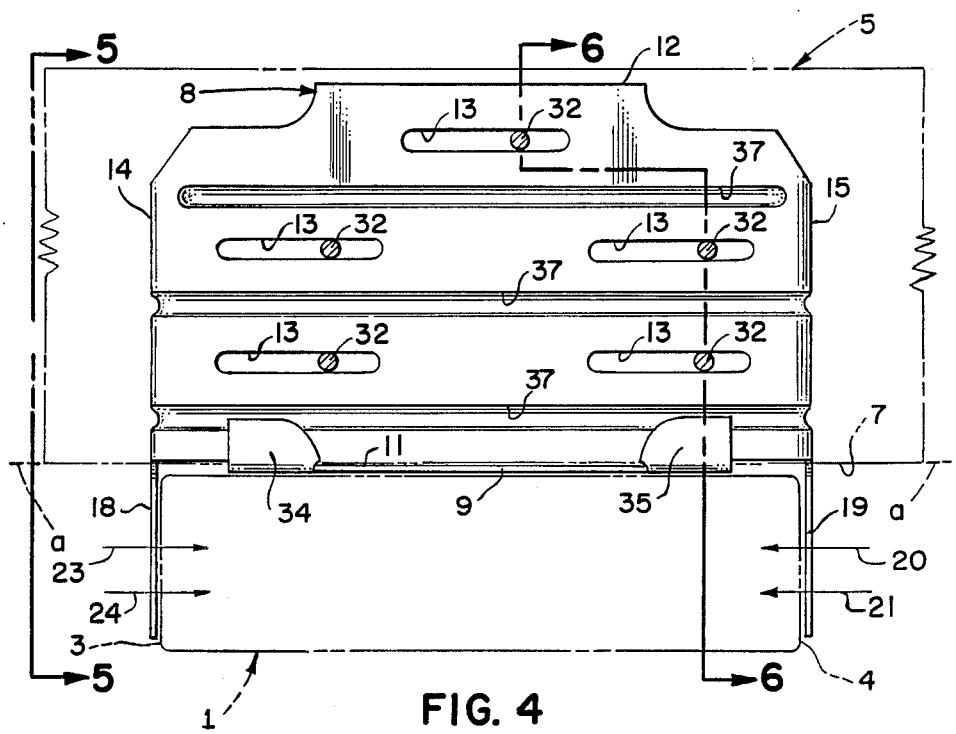
FIG. 4 is a side view of the truss clip taken in the direction of arrows 4—4 shown in FIG. 2.

The first and preferred embodiment of the present invention is set forth in FIGS. 1-7. Referring to the drawings, the invention consists of a building frame connection including, a nailable generally horizontal frame member 1 which under generally accepted building design assumptions is considered to move a negligible amount horizontally under selected normal downward and upward acting frame design loads and having an upwardly facing top face 2 and generally parallel inside and outside edge faces 3 and 4 disposed at right angles to the top face 2; a nailable truss member 5 subject to upward acting truss design forces and selected downward acting truss design load forces and said truss member having a side face 6 and a downwardly facing bottom face 7 disposed at a right angle to the side face and which moves a selected calculated substantial horizontal distance relative to the horizontal frame member under selected downward acting generally accepted assumed building truss design loads.

The improvement includes a truss clip 8 constructed from a single sheet metal member enabling truss member 5 to move a selected substantial horizontal distance relative to the horizontal frame member under selected downward acting truss design loads and exercising vertical restraint between the horizontal frame member and the nailable truss member preventing relative vertical movement between the horizontal frame member and the truss member under selected upward acting truss design forces. The truss clip has a base member 9 having a restrained edge 10 positioned upon the top face 2 of the horizontal frame member 1, and an upper planar face 11 disposed in a first plane "a" (see FIGS. 1 and 4) for slidably receiving the bottom face 7 of the truss member 5; a single generally planar sail member 12 having a back face disposed in face to face registration with the side face 6 of the truss member 5 and a front face 39 on the opposite side of the sail member and the sail member is connected to restrained edge 10 of the base member 9 and disposed in a second plane "b" (see FIGS. 1 and 2) at a right angle to the first plane "a" of the base member 9, formed with a plurality of parallel slots 13 disposed parallel to the first plane "a" of the base member 9 each having a length greater than the selected horizontal distance of movement of the truss member relative to the horizontal frame member, and formed with elongated upstanding inner and outer end edges 14 and 15 providing load transfer paths; a pair of inner and outer stabilizer members 16 and 17 having end edges connected to the elongated upstanding end edges 14 and 15 of the sail member 12 and disposed in parallel third and fourth planes "c" and "d" (see FIGS 1 and 2) angularly to the second plane "b" of the sail member; a pair of inner and outer holding members 18 and 19 each connected respectively to the inner and outer stabilizer members 16 and 17 and each disposed respectively in the third and fourth planes "c" and "d" of the respective stabilizer members and in alignment with the end edges 14 and 15 of the sail member 12; holding means 20, 21, 22, 23, 24, and 25 such as nails indicated by arrows inserted through nail openings 26, 27, 28, 29, 30 and 31 connecting the holding members 18 and 19 to the horizontal frame member 1; nailing means 32 such as nails dimensioned for insertion through the plurality of slots 13 and adapted for connection to the nailable truss member 5, enabling the truss member 5 to move the selected substantial horizontal distance relative to the horizontal frame member and resisting vertical movement of the truss member 5 with respect to the base member 9 of the truss clip 8; the inner end edge 14 of the sail member 12, the inner holding member 18 and the inner stabilizer member 16 all lie in third plane "c"; and the outer end edge 15 of the sail member 12, the outer holding member 19 and the outer stabilizer member 17 all lie in fourth plane "d". It is this structure which prevents premature failure due to tearing of the metal in a "notch effect" which is a problem in the prior art connectors.

As illustrated in the drawings, the upstanding end edges 14 and 15 of the sail member 12 are disposed in the same plane "b" as the parallel slots 13; and the holding members 18 and 19 each respectively intersect the plane of the sail member 12 and extend outwardly in opposite directions from the plane of the sail member 12; and the holding means 20-25 attach to the horizontal frame member 1 on opposite sides of the plane "b" of the sail member.

The inner and outer holding members 18 and 19 could be attached to the top face 2 or the bottom face of the horizontal frame member 2, but preferably they are connected respectively to the inside and outside edge faces 3 and 4 of the horizontal frame member 1.

In order to initially position the truss member 5 with respect to the truss clip 8, and to guide the truss member 5 as it moves with respect to the base member 9, the base member 9 is formed with an unrestrained free edge 33 disposed oppositely the restrained edge 10; and a tab extension member 34 connected to the unrestrained free edge 33 of the base member 9 and disposed at a right angle to the base member adapted for restraining horizontal movement of the nailable truss member. Preferably a second tab extension member 35 is connected to unrestrained free edge 33 of the base member 9.

Figures 5, 6:
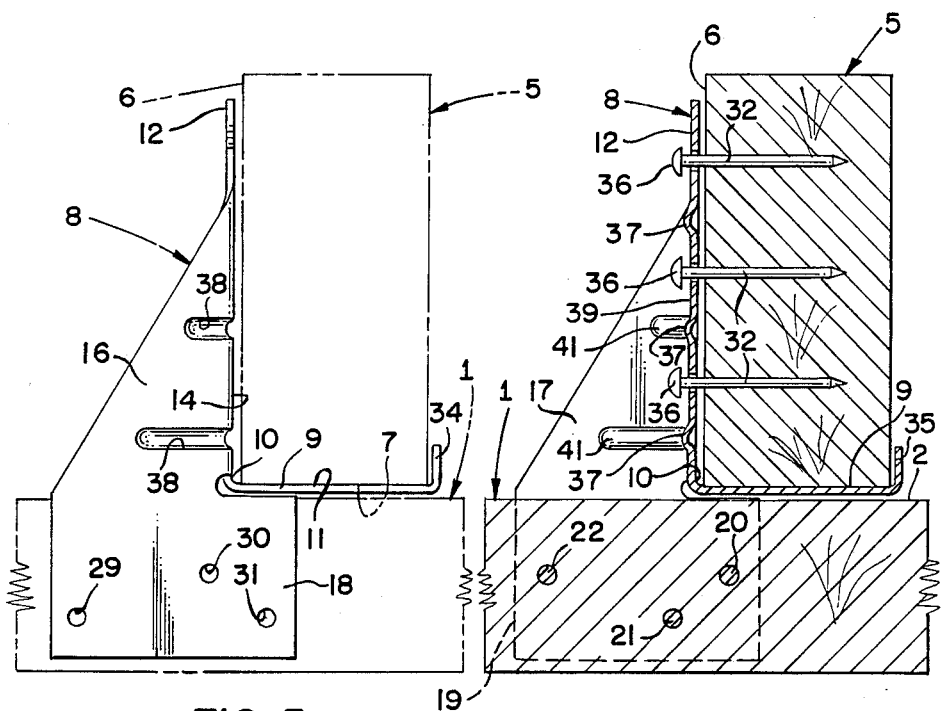
FIG. 5 is an end view of the truss clip taken in the direction of arrows 5—5 shown in FIG. 4.
FIG. 6 is a cross sectional view of the truss clip, bottom chord of the truss, and top plate taken along line 6—6 shown in FIG. 4.
Figure 7:
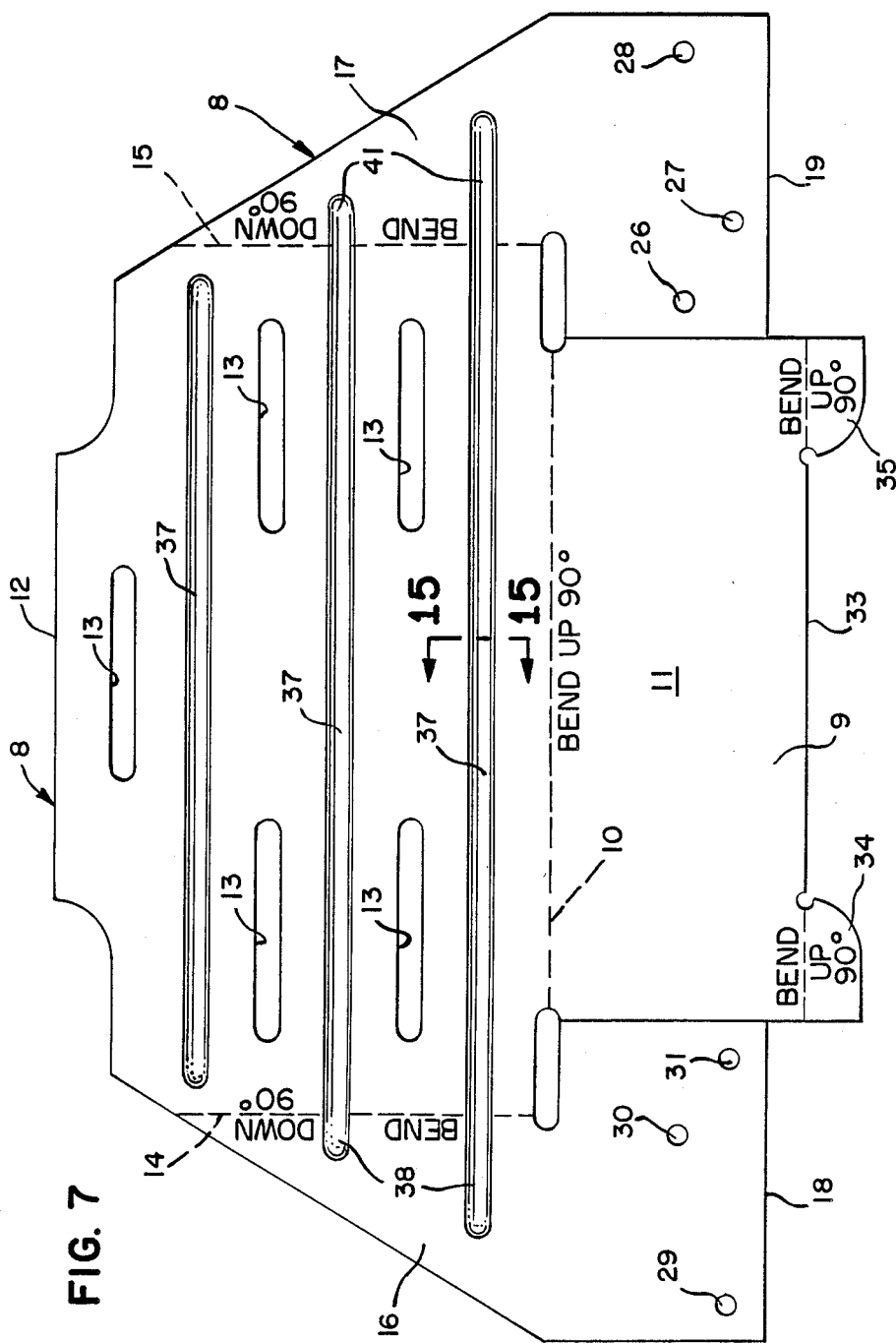
FIG. 7 is a top plan view of the truss clip of the present invention bending.
Figure 8:
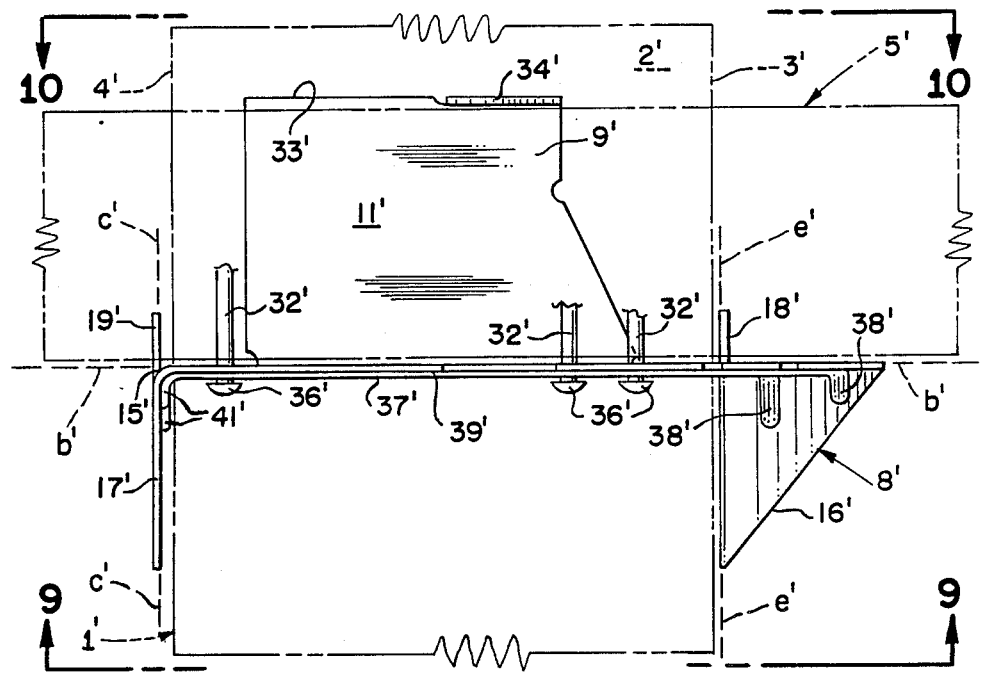
FIG. 8. is a top plan view of another form of the invention. The broken lines represent a top plate or sill plate and the bottom chord of a truss and are shown for purposes of showing a typical installation of the truss clip.
Figure 9:
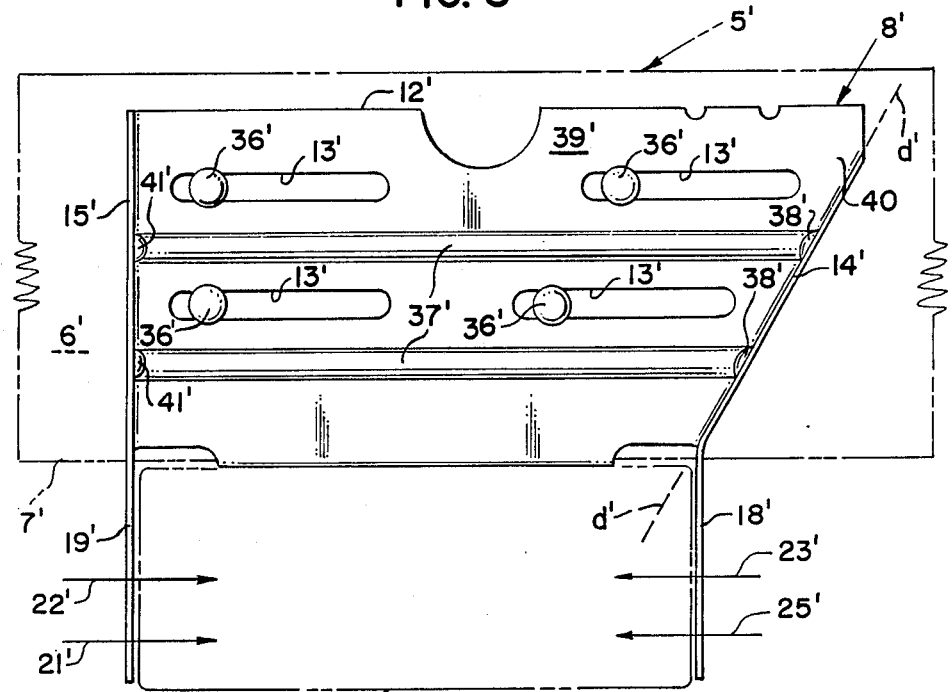
FIG. 9 is a side view of the truss clip shown in FIG. 8 taken in the direction of arrows 9—9.
Figure 10:
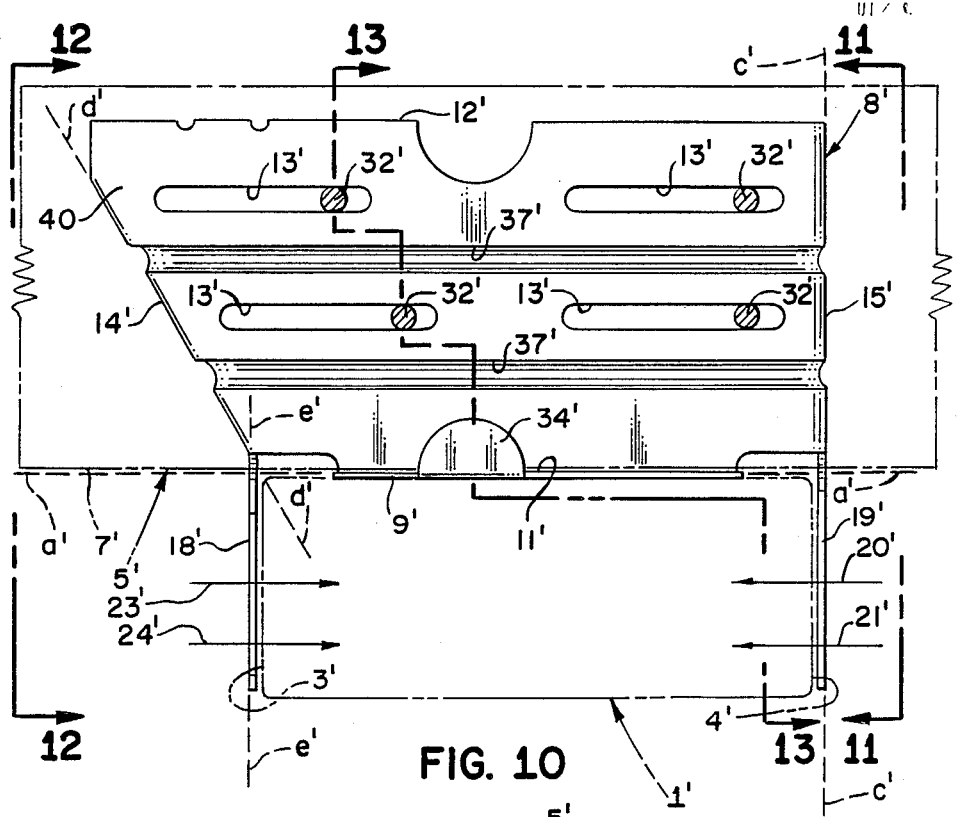
FIG. 10 is a side view of the truss clip shown in FIG. 8 taken in the direction of arrows 10—10.
Figure 11:
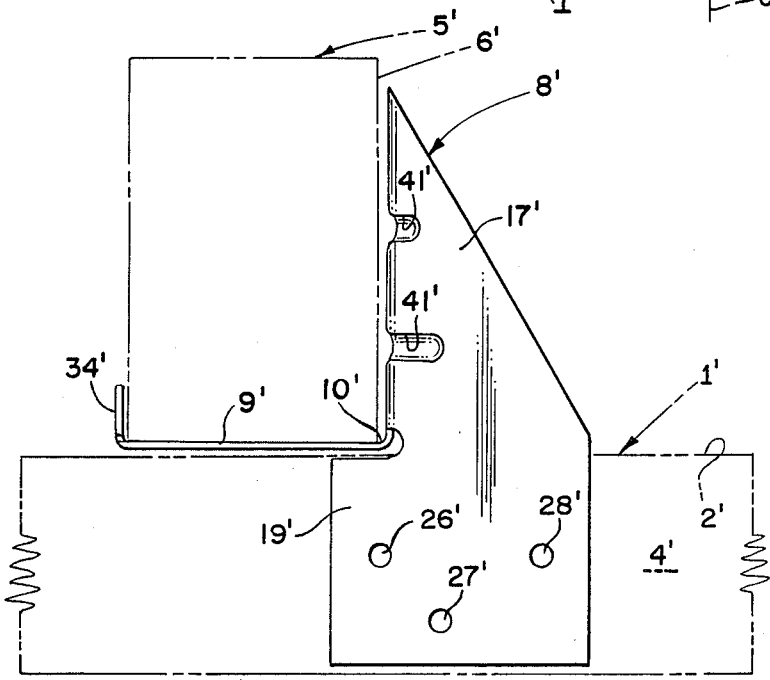
FIG. 11 is a an end view of the truss clip shown in FIG. 10 taken in the direction of arrows 11—11.
Figure 12:
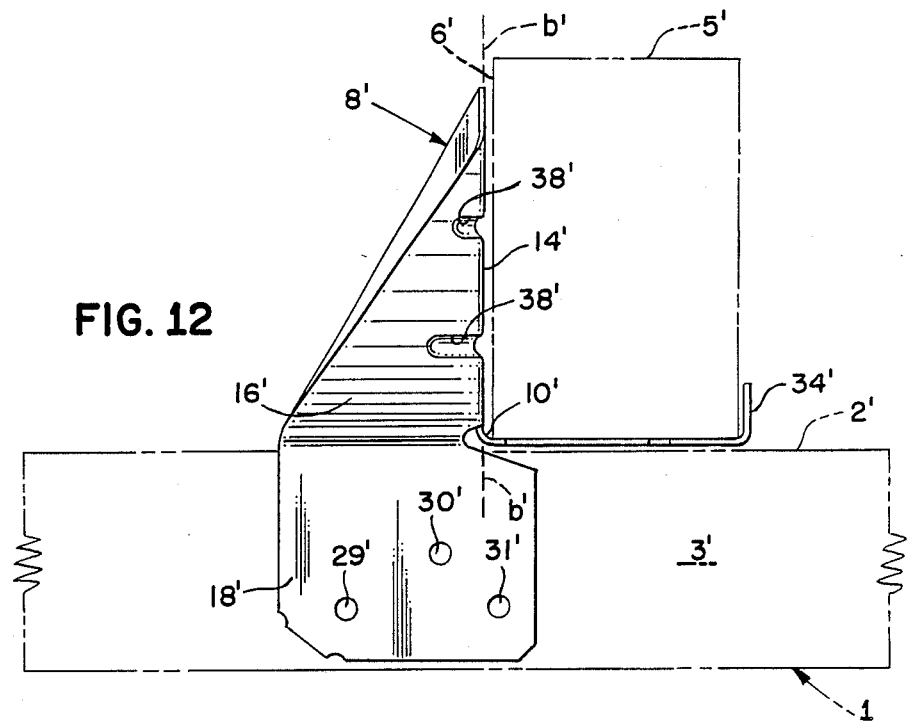
FIG. 12 is an end view of the truss clip shown in FIG. 10 taken in the direction of arrows 12—12.

The nailing means preferably consists of a plurality of nails 32 formed with heads 36. Nails 32 are inserted in the direction of the arrows illustrated in FIG. 1 which are also given the number 32. Projection means such as elongated embossments 37 protruding from the front face 39 of the sail member adjacent the slots prevent seating of the nail heads against the front face of the sail member. The unseated position of the nails 32 is illustrated in FIG. 6. The embossments 37 also add stiffness to the planar face of the sail member. Preferably the embossments 37 wrap around upstanding end edges 14 and 15 and add lateral strength to the truss clip as well. These embossment extensions are indicated by the numbers 38 and 41.

Another form of the invention is illustrated in FIGS. 8-15. The structure and function of the alternate form of truss clip 8' is nearly the same as the previously described truss clip 8. Like or similar parts are identified in the alternate form by like numbers, but distinguished by the addition of the prime symbol ('). The main features of the alternate form are set forth as follows.

Referring to FIGS. 8-15, the alternate building frame connection includes, a nailable generally horizontal frame member 1' which considered to move a negligible amount under generally accepted building design assumptions is horizontally under normal selected downward and upward acting frame design loads and and said frame member having an upwardly facing top face 2' and generally parallel inside and outside edge faces 3' and 4' disposed at right angles to the top face 2'; a nailable truss member 5' subject to selected generally accepted assumed upward acting truss design forces and downward acting truss design load forces and the truss member having a side face 6' and a downwardly facing bottom face 7' resting on the upwardly facing top face 2' of the frame member 1' disposed at a right angle to the side face 6' and which moves horizontally a selected calculated substantial horizontal distance relative to the horizontal frame member under the selected downward acting truss design loads; and the improvement includes a truss clip 8' constructed from a single sheet metal member enabling the truss member 5' to move a selected calculated substantial horizontal distance relative to the horizontal frame member 1' under the selected downward acting truss design load and exercising vertical restraint between the horizontal frame member and the nailable truss member preventing relative vertical movement between the horizontal frame member and the truss member under the selected upward acting truss design forces. The truss clip has a base member 9' having a restrained edge 10' positioned upon the top face 2' of the horizontal frame member 1', and having an upper planar face 11' disposed in a first plane "a'" (see FIG. 10) for slidably receiving the bottom face 7' of the truss member 5'; a single generally planar sail member 12' having a back face disposed in face to face registration with the side face 6' of the truss member 5' and a front face 39' on the opposite side of the sail member 12' and the sail member is connected to the restrained edge 10' of the base member and disposed in a second plane b' at a right angle to the first plane a' of the base member 9' and extending upwardly therefrom and having a portion 40 extending beyond one of the edge faces, such as edge face 3' of the horizontal frame member 1' providing greater sail area, and the sail member 12' is formed with a plurality of parallel slots 13' disposed parallel to the plane of the base member 9', and the sail member 12' is formed with upstanding inside and outside end edges 14' and 15' providing load transfer paths; an outer stabilizer member 17' having an edge connected to the elongated upstanding outer end edge 15' of the sail member 12' and disposed in a third plane "c'" (see FIGS. 8 and 10) at a right angle to the second plane "b'" of the sail member 12'; an inner stabilizer member 16' having an edge connected to the elongated upstanding inner end edge 14' of the sale member 12' and disposed in a fourth plane "d'" (see FIGS. 9 and 10) at a right angle to the second plane "b'" of the sail member 12'; an outer holding member 19' connected to the outer stabilizer member 17' and disposed in the third plane "c'" of the outer stabilizer member 17'; an inner holding member 18' connected to the inner stabilizer member 16' and disposed in a fifth plane "e'" (see FIGS. 8 and 10) parallel to the third plane "c'" of the outer holding member 19'; holding means such as nails 20'-25' driven through nail openings 26'-31' connecting the holding members 18' and 19' to the horizontal frame member 1';

nailing means such as nails 32' dimensioned for insertion through the plurality of slots 13' and adapted for connection to the nailable truss member 5' enabling the selected substantial horizontal movement of the truss member with respect to the base member of the truss clip and resisting vertical movement of the truss member with respect to the base member of the truss clip and having head members 36' dimensioned to provide a stop for the sail member 12'; and projection means 37' protruding from the front face 39' of the sail member 12' adjacent the slots 13' for preventing seating of the head members 36' of the nailing means against the front face 39' of the sail member.

Figure 13:
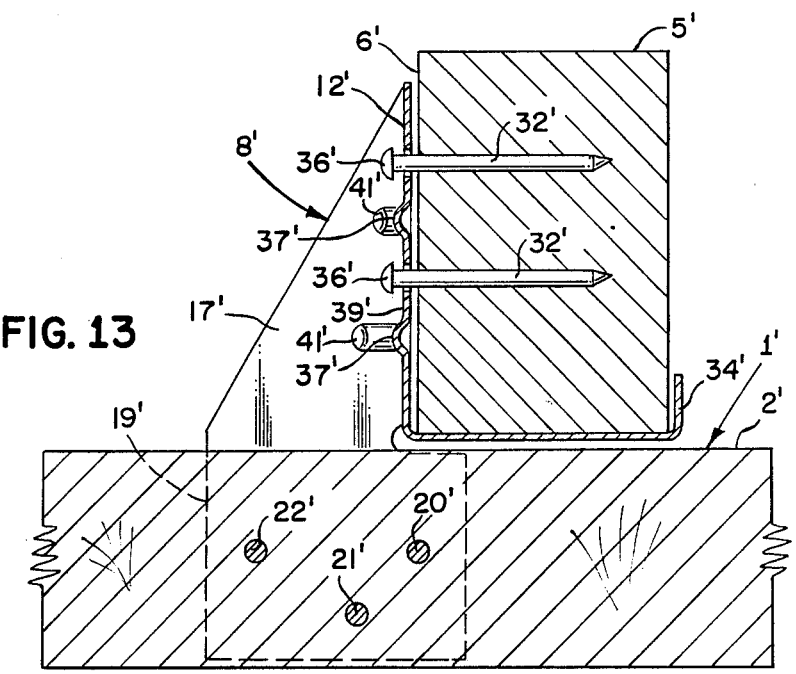
FIG. 13 is a cross sectional view of the truss clip taken along line 13—13 of FIG. 10.

The unseated position of the nails 32' is illustrated in FIG. 13. The embossments 37' also add stiffness to the planar face of the sail member. Preferably the embossments 37' wrap around upstanding end edges 14' and 15' and add lateral strength to the truss clip as well. These embossment extensions are indicated by the numbers 38' and 41'. Preferably, a tab extension member 34' is connected to the unrestrained free edge 33' disposed oppositely the restrained edge 10' for restraining horizontal movement of the nailable truss member 5'.

For trusses constructed from 2×4 and 2×6 wood members, the truss connector of the present invention is preferably formed from 16 gauge steel with a galvanized finish. For the 2×4 wood members, the distance between holding members may be 3 ¼", and for 2×6 wood members, the distance may be 5 ¼". The slots in the sail member for both sizes should be 1 ¼" in length. Fasteners for the 2×4 wood member size should be 4 10d into the truss and 4 10d into the plate. With such nailing, the allowable uplift load is 625 pounds with a failure load of 1,900 pounds. Fasteners for the 2×6 wood member size should be 5 10d into the truss and 6 10d into the plate. With such nailing the allowable uplift load is 780 pounds with a failure load of 2,500 pounds.

OPERATION

As shown in FIGS. 1–6, the preferred form of truss clip is placed on horizontal frame member 1 and nails 20–25 are driven into the inside and outside edges 3 and 4 of the horizontal member. Downwardly facing bottom face 7 of the truss member 5 is then placed on upper planar face 11 of base 9 of the truss clip 8. Nails 32 are than driven through slots 13 in the direction shown by arrows indicated by the numbers 32 as illustrated in FIG. 1. The nails are driven from the front face side 39 of sail member 12. Note that the elongated embossments 37 prevent the heads 36 of the nails 32 from seating against front face 39 of the sail member 12 as illustrated in FIG. 6 of the drawings. In all of the truss clips, the nails must be installed at the slot end toward the inside of the building to enable substantial horizontal movement of the truss member relative to the horizontal member 1.

Almost all movement of the truss member sliding over the base member 9 occurs during the construction of the building as the roof is being constructed on the truss members. In the event, however, of a hurricane, earthquake or other cataclysmic event which causes the load forces to reverse, and uplift to occur, then the truss is prevented from moving upwardly since the nails 32 would be stressed in shear at the slots 13 of the sail member.

Since load on the sail member 12 is transmitted at inner and outer end edges 14 and 15 to the inner and outer stabilizer members 16 and 17 directly to the inner and outer holding members 18 and 19 without a moment arm, there is no premature failure of the truss clip member 8 due to the well known "notch effect" which is a problem in other competing truss clip connectors. As set forth above, inner edge 14, inner stabilizer member 16 and inner holding member 18 are all in the same plane. In like manner, outer end edge 15, outer stabilizer member 17 and outer holding member 19 are all in the same plane.

Operation of the alternate form of the invention illustrated in FIGS. 8–14 is similar to the preferred form. The alternate form has the advantage that greater sail area can be obtained by extending part of the sail area beyond the horizontal frame member 1'. This enables the slots 13' to accommodate the relative movement of the nails within the slots.

I claim:
1. A building frame connection including,
   a. a nailable generally horizontal frame member which under generally accepted building design assumptions is considered to move a negligible amount horizontally under normal design selected downward and upward acting frame design loads and said frame member having an upwardly facing top face and generally parallel inside and outside edge faces disposed at right angles to said top face;
   b. A nailable truss member subject to selected upward acting truss design forces and selected downward acting truss design load forces and said truss member having a side face and a downwardly facing bottom face disposed at a right angle to said side face and which moves a selected calculated substantial horizontal distance relative to said horizontal frame member under said selected downward acting generally accepted assumed building truss design loads;
   c. the improvement including a truss clip constructed from a single sheet metal member enabling said truss member to move said selected calculated substantial horizontal distance relative to said horizontal frame member under said selected downward acting truss design loads and exercising vertical restraint between said horizontal frame member and said nailable truss member preventing relative vertical movement between said horizontal frame member and said truss member under said selected upward acting generally accepted assumed building truss design forces comprising:
      1. a base member having a restrained edge positioned upon said top face of said horizontal frame member, and having an upper plane face disposed in a first plane for slidably receiving said bottom face of said truss member;
      2. a single generally planar sail member having a back face disposed in face to face registration with said side face of said truss member and a front face on the opposite side of said sail member and said sail member is connected to said restrained edge of said base member and disposed in a second plane at a right angle to said first plane of said base member, formed with a plurality of parallel slots disposed parallel to said first plane of said base member each having a length greater than said selected calculated substantial horizontal distance of movement of said truss member relative to said horizontal frame member, and formed with elongated upstanding inner and outer end edges providing load transfer paths;
3. inner and outer stabilizer members having end edges connected respectively to said elongated upstanding end edges of said sail member and disposed respectively in parallel third and fourth planes angularly to said second plane of said sail member;
4. inner and outer holding members each connected respectively to said inner and outer stabilizer members and each disposed respectively in said third and fourth planes of said respective stabilizer members;
5. holding means connecting said inner and outer holding members to said horizontal frame member;
6. nailing means dimensioned for insertion through said plurality of slots and adapted for connection to said nailable truss member, enabling said truss member to move said selected calculated substantial horizontal distance relative to said horizontal frame member and resisting vertical movement of said truss member with respect to said base member of said truss clip; '7. said inner and edge of said sail member, said inner holding member and said inner stabilizer member lie in said third plane; and
8. said outer end edge of said sail member, said outer holding member, and said outer stabilizer member lie in said fourth plane.

2. A building frame connection as described in claim 1 comprising:
a. said nailing means consists of a plurality of nails formed with heads; and
b. projection means protruding from said front face of said sail member adjacent said slots for preventing seating of said nail heads against said front face of said sail member.

3. A building frame connection as described in claim 1 wherein:
a. said holding means attach to said horizontal frame member on opposite sides of said plane of said sail member.

4. A building frame connection as described in claim 3 wherein; a. said holding members are connected respectively to said inside and outside edge faces of said horizontal frame member.

5. A building frame connection as described in claim 4 comprising: a. said base member is formed with an unrestrained free edge disposed opposite said restrained edge; and b. a tab extension member connected to said unrestrained free edge of said base member and disposed at a right angle to said base member adapted for restraining horizontal movement of said nailable truss member in a direction at right angles to said second plane in which said sail member lies.

6. A building frame connection including,
a. a nailable generally horizontal frame member which under generally accepted building design assumptions is considered to move a negligible amount horizontally under normal design selected downward and upward acting frame design loads and said frame member having an upwardly facing top face and generally parallel inside and outside edge faces disposed at right angles to said top face;
b. a nailable truss member subject to selected upward acting truss design forces and downward acting truss design load forces and said truss member having a side face and a downwardly facing bottom face disposed at a right angle to said side face and which moves a selected calculated substantial horizontal distance relative to said horizontal frame member under said selected downward acting generally accepted assumed truss design loads;
c. the improvement including a truss clip constructed from a single sheet metal member enabling said truss member to move said selected substantial horizontal distance relative to said horizontal frame member under said selected downward acting generally accepted assumed truss design load and exercising vertical restraint between said horizontal frame member and said nailable truss member preventing relative vertical movement between said horizontal frame member and said truss member under said selected upward acting generally accepted assumed truss design loads comprising:
1. a base member having a restrained edge positioned upon said top face of said horizontal frame member, and having an upper planar face disposed in a first plane for slidably receiving said bottom face of said truss member;
2. a single generally planar sail member having a back face disposed in face to face registration with said side face of said truss member and a front face on the opposite side of said sail member and said sail member is connected to said restrained edge of said base member and disposed in a second plane at a right angle to said first plane of said base member, and extending upwardly therefrom and having a portion extending beyond one of said edge faces of said horizontal frame member providing greater sail area, and said sail member is formed with a plurality of parallel slots disposed parallel to said first plane of said base member each having a length greater than said selected substantial horizontal distance of movement of said truss member relative to said horizontal frame member, and said sail member is formed with upstanding inside and outside end edges providing load transfer paths;
3. an outer stabilizer member having an edge connected to said elongated upstanding outer end edge of said sail member and disposed in a third plane at a right angle to said second plane of said sail member;
4. an inner stabilizer member having an edge connected to said elongated upstanding inner end edge of said sail member and disposed in a fourth plane at a right angle to said second plane of said sale member;
5. an outer holding member connected to said outer stabilizer member and disposed in said third plane of said outer stabilizer member;
6. an inner holding member connected to said inner stabilizer member and disposed in a fifth plane parallel to said third plane of said outer holding member;
7. holding means connecting said holding members to said horizontal frame member;
8. nailing means having shanks dimensioned for insertion through said plurality of slots and adapted for connection to said nailable truss member enabling said selected substantial horizontal movement of said truss member with respect to said horizontal frame member and resisting vertical movement of said truss member with respect to said base member of said truss clip and having a head member dimensioned to provide a stop for said sail member; and 9. projection means protruding from said front face of said sail member adjacent said slots for preventing seating of said head members of said nailing means against said front face of said sail member.

* * * * *

UNITED STATES PATENT AND TRADEMARK OFFICE
CERTIFICATE OF CORRECTION

PATENT NO. : 4,932,173
DATED : June 12, 1990
INVENTOR(S) : Alfred D. Commins

It is certified that error appears in the above-identified patent and that said Letters Patent is hereby corrected as shown below:

Column 1, line 61, after the word "invention" insert ---prior to---.
Column 4, line 5, after the word "which" insert ---under general accepted building design assumptions is---.
Column 4, line 6, after the word "amount" insert ---horizontally---.
Column 4, line 6, after the word "under" delete ---generally accepted building design assumptions is horizontally under---.
Column 7, line 25, before the word "edge" change "and" to ---end---.

Signed and Sealed this

Sixteenth Day of July, 1991

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,932,173
DATED : June 12, 1990
INVENTOR(S) : Alfred D. Commins

It is certified that error appears in the above-identified patent and that said Letters Patent is hereby corrected as shown below:

Column 4, line 8, after the words "loads and" delete ---and---.
Column 5, line 46, change the word "than" to ---then---.
Column 8, line 53, change the word "sale" to ---sail---.

Signed and Sealed this

Thirteenth Day of August, 1991

*Attest:*

HARRY F. MANBECK, JR.

*Attesting Officer*  *Commissioner of Patents and Trademarks*